United States Patent Office 3,645,981
Patented Feb. 29, 1972

3,645,981
PROCESS FOR PREPARING POLYTHIOUREAS
Willard Hallam Bonner, Jr., Wilmington, Del., assignor to E. I. du Pont de Nemours and Company, Wilmington, Del.
No Drawing. Filed Oct. 27, 1969, Ser. No. 869,869
Int. Cl. C08g 22/02
U.S. Cl. 260—77.5 CH                    13 Claims

ABSTRACT OF THE DISCLOSURE

Polythioureas are prepared by the solution polymerization of suitable aliphatic and/or alicyclic diamines and carbon disulfide in specified solvents within a controlled temperature range. In this process, shorter reaction times than are required in known processes, provide high molecular weight polymer.

---

This invention relates to a novel process for preparing high-molecular weight polythioureas.

BACKGROUND OF THE INVENTION

Polythioureas are known polymeric materials. Processes for preparing polythioureas (e.g., polyhexamethylenethiourea) from diamines and carbon disulfide have been disclosed. For example, U.S. Pats. 2,313,871, 2,356,764, 2,566,717, 2,884,401, and 3,265,667 and British Pats. 524,795 and 696,964 each disclose this reaction in bulk or in a reaction medium. Suitable reaction media disclosed in these references include water, alcohol (e.g., methanol and hexanol) ether, phenol, benzene and xylene. These processes are not entirely suitable in that (1) excessively long reaction times are required, (2) the reaction temperatures required result in undesirable side reactions and/or (3) high molecular weight polymer is not obtainable.

SUMMARY OF THE INVENTION

This invention provides a novel process for preparing high molecular weight homo- and co-polythioureas comprising reacting a suitable diamine(s) and carbon disulfide, while the reactants are dissolved in a specified solvent or solvent mixture, as described hereinafter. The solution is heated to a temperature between about 100–150° C. for about 0.5 to 24 hours.

In the process of this invention shorter reaction times than are required in known processes provide high molecular weight polymer.

The high molecular weight polythioureas prepared by the process of this invention exhibit inherent viscosities of at least about 0.25, preferably above about 0.5, when measured by procedures subsequently described herein. Shaped articles such as films and fibers are prepared.

DESCRIPTION OF THE PREFERRED EMBODIMENTS

Diamines

The novel process of this invention provides polythioureas by causing carbon disulfide to react with appropriate aliphatic and/or alicyclic diamines and mixtures thereof under specified polymerization conditions. The diamines useful in the process of this invention may be represented by the structural formula:

(I)    

wherein Z is a divalent organic radical containing 4 to 20 carbon atoms. By "divalent organic radicals" is meant divalent radicals which are predominantly alicyclic and/or aliphatic hydrocarbon which may have substituents for hydrogen (e.g., halogen).

Preferred polythioureas are prepared from diamines, hereinafter called "G-PACM," represented by the formula:

(II)   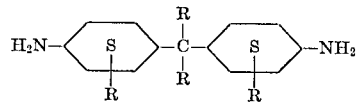

wherein R is hydrogen or methyl, the hexagon represents a cyclohexylene radical. The most preferred diamine of Formula II is bis(p-aminocyclohexyl)methane, hereinafter called "PACM." Among the other suitable G-PACM diamines may be named bis(2 - methyl-4-aminocyclohexyl)methane and bis(p-aminocyclohexyl propane.

G-PACM, due to its carbocyclic nature, is a mixture of isomers having trans-trans (t.t.), cis-trans (c.t.), and cis-cis (c.c.) configurations. Hydrogenation conditions used to prepare G-PACM produce a mixture of isomers. For example, different hydrogenation conditions produce different isomer distribution in PACM, as shown in U.S. 2,494,563 and U.S. 2,606,924. In the process of the present invention it is preferred that the G-PACM reactant be comprised of at least about 30% by weight of the trans-trans (t.t.) isomer.

Other Formula I diamines useful in the process of this invention include tetramethylene diamine; pentamethylene diamine; hexamethylene diamine; octamethylene diamine; nonamethylene diamine; decamethylene diamine; dodecamethylene diamine; 1,4-diaminocyclohexane; 1,3-diaminocyclohexane; perhydrobenzidine; 4,4' - (isopropylidene) dicyclohexylamine; p-xylylene diamine and 1,4-bis(2-aminoethyl)benzene.

POLYMERIZATION CONDITIONS

The process of this invention is carried out in particular solvents or mixtures thereof. Preferred solvents include: N,N-dimethylacetamide; N,N-dimethylformamide; hexamethylphosphoramide; N-methylpyrrolidone - 2; dimethylsulfoxide; and pyridine.

Other suitable solvents include the following amide and urea media: N,N-dimethylpropionamide; N,N-dimethylbutyramide; N,N-dimethylisobutyramide; N,N-dimethylmethoxyacetamide; N,N - diethylacetamide; N-methylpiperidone - 2; N-methylcaprolactam; N-methylpyrrolidone - 2; N-ethylpyrrolidone-2; N-acetylpyrrolidine; N-acetylpiperidine; N,N' - dimethylethyleneurea; N,N'-dimethylpropyleneurea; N,N,N'N' - tetramethylurea; and tetramethyl methylphosphondiamide. The use of these solvents, under process conditions of this invention, rather than other reaction media, permits shorter reaction times to obtain high molecular weight polymer (note comparative Example 9 wherein the use of xylene and toluene media are shown).

The solvents useful herein may contain LiCl or $CaCl_2$ (usually 1 to 8% by weight of the total weight of ingredients) to aid in maintaining a fluid reaction mixture, as well as in obtaining a dope which can be used directly in the preparation of shaped articles, as more fully described hereinafter.

The reaction is carried out at temperature between about 100 and 150° C., preferably 100 to 130° C. Below about 100° C. the rate of polymerization is too low for most purposes. Above about 150° C., side reactions which result in a reduction in molecular weight and/or introduce undesirable color, result.

The reaction is maintained within the above temperature range for about 0.5 to 24 hours (preferably 2 to 6 hrs.); the optimum time within this range is dependent upon the particular diamine and the particular solvent of this invention which is utilized. Reaction times longer than optimum are not desirable in view of the expense and side reactions which may tend to decrease the molecular weight of the product. Useful products may still be obtained when longer reaction times are utilized. However, the significant advantages provided by the present invention are best seen in the high molecular weight polymer which can be produced during these shorter time periods, as is shown in the examples (note, in particular, Example 26).

The reaction is preferably carried out under nitrogen, most preferably by flushing the reaction mixture with a rapid stream of nitrogen. The diamine(s) and carbon disulfide can be employed in approximately equimolar quantities or the carbon disulfide can be used in excess amounts, e.g., up to 100% excess or higher.

The polymer may be precipitated by combining the reaction mixture with a non-solvent (e.g., water, methanol), after which the product is collected, washed, and dried prior to subsequent processing. If desired, certain reaction mixtures, i.e., those from which the polymer had not precipitated, may be used directly for the preparation of shaped articles. For such a use, it is preferred that the heated reaction mixture be permitted to cool to room temperature, after which a quantity of salt, as previously mentioned, is added. Since the percent polymer soluble in solution varies with the solvent employed, the percent salt present also varies from solvent to solvent. For example, less LiCl is preferred in hexamethylphosphoramide than in N-methylpyrrolidone-2 or N,N-dimethylacetamide. The combined ingredients are then stirred at room temperature, e.g., for up to 0.5 hour or longer, to form a stable solution suitable for, e.g., spinning.

The following polythiourea homopolymers are among those prepared by the process of this invention:

poly(4,4'-methylenedicyclohexylenethiourea),
polyhexamethylenethiourea,
polyocetamethylenethiourea,
polynonamethylenethiourea,
polydecamethylenethiourea,
polydodecamethylenethiourea,
poly(3,3'-dimethyl-4,4'-methylenedicyclohexylenethiourea).

Copolythioureas are prepared by the process of this invention, by the same procedures (e.g., solvents, reaction times, reaction temperatures) described above, utilizing two or more suitable diamines. Mixtures of Formula I diamines are caused to react with carbon disulfide to produce the copolythioureas ($H_2S$ is a by-product). Copolymers prepared by the process of this invention comprise the entire composition range provided by the use of Formula I diamines. Preferred copolymers are derived from at least about 35 (preferably at least 75) mole percent (based on diamine content) of Formula II diamines, most preferably wherein R is hydrogen. These copolymers preferably exhibit an inherent viscosity of at least about 0.5 in m-cresol as measured by procedures described hereinafter.

Preferred copolythioureas prepared by the process of this invention are copoly(4,4'-methylenedicyclohexylenethiourea/1,4-cyclohexylenethiourea) (50/50 and 75/25, mole basis) and copoly(4,4'-methylenedicyclohexylenethiourea/4,4' - dicyclohexylenethiourea) (75/25, mole basis).

SHAPED ARTICLE PREPARATION

The homo- and co-polythioureas prepared by the process of this invention, which are isolated in bulk form may be converted into shaped articles by first incorporating them into solutions or dopes which are then extruded into fibers, cast into films, formed into fibrids, etc. The solid homo- or co-polythiourea is redissolved at room temperature in a solvent or mixture of solvents selected from the group of N,N-dimethylacetamide; N-methylpyrrolidone-2; hexamethylphosphoramide; and N,N-dimethylformamide to which is preferably added LiCl or $CaCl_2$. The solutions may contain from about 4 to about 10 weight percent of the polymer or copolymer, from about 1.5 to about 10 weight percent of LiCl (when $CaCl_2$ is employed, about 4 to about 6 weight is preferred), and the balance is one or more of the appropriate solvents previously noted.

Fibers, films, and other shaped articles are directly prepared, also, from the previously described reaction mixtures wherein the polymeric products are not isolated. For such preparations, the procedures described below are applicable.

The polymer can be formed into fibers by extruding the above-described solutions via conventional wet- and dry-spinning techniques. In wet spinning, which is preferred, an appropriately prepared solution, whose temperature may vary from about 10 to 100° C., is extruded into a suitable coagulating bath, e.g., a water bath maintained between about 5 to 85° C. When spinning hexamethylphosphoramide solutions, water/hexamethylphosphoramide mixtures (e.g., 75/25, v./v.) may be used as baths. Similarly, bath mixtures of water/N,N-dimethylacetamide (e.g., 25/75, v./v.) may be used when extruding N,N-dimethylacetamide solutions. The temperature of the bath and the LiCl content of the spinning solution affect the cross-sectional shape of the fiber obtained. For example, when a N-methylpyrrolidone-2 solution of poly(4,4'-methylenedicyclohexylene)thiourea is extruded into a water bath at 5° C., round filaments are obtained; dog-bone shaped filaments result when the water bath is at 70° C. Use of solutions with higher LiCl content, and baths of lower temperature, favor the production of round filaments from both hexamethylphosphoramide and N,N-dimethylacetamide spinning solutions. Dry spinning may be accomplished by extruding a spinning solution into a heated current of gas whereby solvent evaporation occurs and filaments are formed.

After being formed, the fibers of this invention may be treated with a finish composition and wound up on bobbins. Residual solvent and salt may be removed by soaking the bobbins, e.g., in water or methanol, after which the fibers are dried. Removal of the salt and solvent may also be accomplished by passing the fiber through aqueous baths prior to wind up, by flushing the bobbins with water during wind up, etc.

The solutions comprising the homo- and co-polythioureas of this invention may be formed into strong self-supporting films by conventional wet extrusion methods. The solutions may also be used to prepare fibrids, useful for paper preparation, via the precipitation procedures described in Morgan U.S. 2,999,788.

It will be understood that the usual additives such as dyes, fillers, antioxidants, etc., can be incorporated in with the homo- and co-polythioureas for the purposes intended prior to shaped article preparation.

FIBERS: PROPERTIES AND PROCESSING

Fibers obtained from the homo- and co-polythioureas prepared by the process of this invention exhibit desirable properties. Preferred fibers (derived from G-PACM diamines), when heat treated, as described hereinafter, possess a combination of desirable tensile and recovery properties and a high wash-set recovery angle. In addition, these preferred fibers exhibit excellent stability against degradation and loss of properties caused by UV light, oxidative bleach treatments, exposure to high temperatures and high humidity. The tensile and other properties of these fibers are enhanced by subjecting them to a post-extrusion hot drawing treatment which can be carried out in steam or in an otherwise-heated atmosphere (e.g., hot ovens, tubes, furnaces, etc.), or by use of hot plates, bars, shoes, or other suitable devices. Preferably, steam drawing is performed at a pressure of 5–50 lb./in.$^2$ (0.35–3.50 kg./cm.$^2$) with a draw ratio of 1.1–1.7X. Drawing in heated ovens, tubes, furnaces, etc., or over hot plates, bars, shoes, and the like is performed at 200 to 315° C., preferably 230 to 290° C., at a draw ratio of 1.1 to 2.0X. Residence or contact time of the fiber in or on the heated medium is from 2 to 30 sec., preferably from 10 to 20 sec.

MEASUREMENTS AND TESTS

Inherent viscosity: Inherent viscosity ($\eta_{\text{inh.}}$) is defined by the following equation:

$$\eta_{\text{inh.}} = \frac{\ln(\eta_{\text{rel.}})}{C}$$

wherein ($\eta_{\text{rel.}}$) represents the relative viscosity and C represents a concentration of 0.5 gram of the polymer in 100 ml. of solvent. The relative viscosity ($\eta_{\text{rel.}}$) is determined by dividing the flow time in a capillary viscometer of a dilute solution of the polymer by the flow time for the pure solvent. The dilute solutions used herein for determining ($\eta_{\text{rel.}}$) are of the concentration expressed by (C), above; flow times are determined at 30° C., using m-cresol (I) or N,N-dimethylactamide/LiCl (95/5 wt./wt.) (II), unless otherwise specified. Values determined in II are usually about 1.5X those determined in I.

Fiber tensile properties: Fiber properties of tenacity, elongation, and initial modulus are coded as T/E/Mi and are reported in their conventional units, i.e., grams per denier, percent, and grams per denier. Denier is coded as Den. Such properties are conveniently measured on equipment as specified in ASTM specification D76–53, (October 1962), utilizing a testing machine, e.g., an Instron tester (product of the Instron Engineering Corp., Canton, Mass.), providing a constant rate of extension. Unless otherwise specified, samples having a break elongation of up to about 8% are tested at a rate of extension of 10%/minute; samples of higher break elongation are tested at 60%/minute. Samples are filaments which measure 1 inch (2.54 cm.) in length of yarns having 3 turns/inch which measure 10 inches (25.4 cm.) in length; and testing is done at 21° C. and 65% R.H. unless otherwise specified.

If samples are not boiled off (scoured), they are generally conditioned at 21° C. and 65% R.H. for at least 16 hours unless otherwise specified. If boil-off is specified, it consists of boiling the filaments or yarns for 30 minutes in 0.1% aqueous sodium lauryl sulfate, rinsing, drying at 40° C. for 1 hr. and conditioning at 21° C. and 65% R.H. for at least 16 hours, unless otherwise specified.

Example 1.—This example illustrates the preparation of poly(4,4'-methylenedicyclohexylenethiourea) according to the process of this invention.

In a 250 ml. 3-necked flask equipped with a stirrer, gas inlet and outlet tubes, and a reflux condenser are placed PACM (7 g., 0.033 mole, 70% t.t.), $CS_2$ (2 ml., 2.5 g., 0.033 mole), dimethylsulfoxide (100 ml.), and pyridine (2.66 ml., 0.033 mole). The reaction mixture is stirred and heated at 100° C. overnight under a slow stream of nitrogen, after which it is allowed to stand at room temperature for 24 hr. The reaction mixture is poured into water to precipitate the polymer which is collected, washed 3 times with water and once with acetone, and dried to yield 7 g. of polymer; $\eta_{\text{inf.}} = 1.43$ (I).

A sample of the above-prepared polythiourea (5 g.) is dissolved in hexamethylphosphoramide (50 ml.) to form a spinning solution. To a portion of this solution is added LiCl (1.5 g.) and the resulting spin dope is extruded through a 20-hole spinneret, each hole of 0.002 inch (0.005 cm.) diameter, into a water bath maintained at room temperature. The resulting filaments are wound up at 26 ft./min. (7.9 m./min.), washed, and dried. They exhibit the following tensile properties: T/E/Mi/Den.: 1.7/57.6/34.6/2.7.

Presented below in Table I are the results of other syntheses of poly(4,4'-methylenedicyclohexylenethiourea) by the general process of Example 1 but where different solvents (replacement for dimethylsulfoxide in Ex. 1 above) and/or different reaction conditions are employed. The process of Example 1 is repeated except as noted in the table or the footnote thereto. Unless noted otherwise, $\eta_{\text{inf.}}$ values are determined in m-cresol. Products of these syntheses are useful for the formation of shaped articles, such as fibers and films.

TABLE I

| Example | Solvent | Reaction variables | Polymer $\eta_{\text{inh.}}$ | Yield, g. |
|---|---|---|---|---|
| 2 | Dimethylsulfoxide | Reaction temp.=130° C.; polymer isolated at end of heating period | 1.19 | 8 |
| 3 | Hexamethylphosphoramide | Polymer isolated at end of heating period | 0.80 | 6.6 |
| 4 | N-methylpyrrolidone-2 | LiCl (3 g.) added after 5 min. of heating; Polymer isolated at end of heating period. | 0.77 | 6.6 |
| 5 | N,N-dimethylacetamide | LiCl (3 g.) added as in Example 4 | 0.69 | 6.2 |
| 6 | Hexamethylphosphoramide | 25% excess of $CS_2$ used; Rx. mixture stands at room temp. about 2 days after heating period before polymer is isolated. | 2.3 | 7.3 |
| 7 | N,N-dimethylformamide | 20% excess of $CS_2$ used; no pyridine used. Mixture heated at 110° C. LiCl (1.5 g.) added after overnight heating. $\eta_{\text{inh.}}$ determined at end of heating period and after LiCl addition. | II 1.73 | |
| 8 | N,N-dimethylacetamide | 50% excess of $CS_2$ used; No pyridine used. Mixture heated and LiCl added, as in Example 7. | II 2.02 | |

See footnotes at end of Table III.

Example 9.—This example illustrates processes, similar to Examples 1 to 8, but which do not utilize solvents of this invention.

Poly(4,4'-methylenedicyclohexylenethiourea) is prepared by the general process of Example 1 but xylene (B.P. range 137–140° C.) or toluene (B.P. range 110–

111° C.) is used as the reaction medium instead of dimethylsulfoxide and 50% excess of $CS_2$ is used.

When xylene is used, the reaction mixture is heated to reflux temperature for 48 hours. A solid polymer in essentially quantitive yield precipitates; $\eta_{inh.}=0.90$ (II).

When toluene is used, the reaction mixture is heated at reflux temperature for 6 days. A sample ($\eta_{inh.}=0.88$, (II) is removed after 3 days of heating; 2 ml. of $CS_2$ are added. A solid polymer in essentially quantitative yield precipitates; $\eta_{inh.}=1.12$ (II).

In each of these preparations, excessively long reaction times were required, compared to the times required for polymer of similar molecular weights prepared using solvents of this invention.

Example 10.—This example illustrates the preparation of poly(4,4'-methylenedicyclohexylenethiourea) in pyridine; fiber preparation by wet spinning is also shown.

To a solution of PACM (21.0 g., 0.10 mole, 70% t.t.) 1.0 g. of sulfur and 6 g. of lithium chloride in 200 ml. of pyridine is slowly added 12 ml. (15.1 g.) of carbon disulfide; the mixture is stirred overnight at room temperature, during which time little reaction apparently occurs. The mixture is then heated to 120° C. for about two hours during which time hydrogen sulfide evolution begins. After being heated at 120° C. for 5.5 hours, the viscous solution is poured into methanol to precipitate the polymer. The polymer is washed and dried; $\eta_{inh.}=0.72$ (I). The polymer is redissolved in 97/3 wt./wt. N,N-dimethylacetamide/lithium chloride to give a 9% by weight spinning dope. The dope is extruded into a water bath; useful fibers are produced.

Example 11.—Illustrated herein is the preparation of a PACM-$CS_2$ salt which is isolated and converted into poly(4,4'-methylenedicyclohexylenethiourea).

To a solution of PACM (108.6 g., 0.52 mole, 70% t.t.) dissolved in N,N-dimethylacetamide (800 ml.) is added, under nitrogen, a solution of $CS_2$ (42 ml., 0.7 mole) in N,N-dimethylacetamide (100 ml.). The resulting viscous solution is stirred overnight at ambient temperature, after which it is combined with methanol to prceipitate the above-identified salt. The white, crystalline salt is collected by filtration washed with methanol and dried in a vacuum oven at 60° C., yield is 136 g.

A reaction mixture is prepared (under nitrogen) by combining the above-prepared PACM-$CS_2$ salt (16 g.), pyridine (185 ml.), LiCl (6 g.), and a catalytic amount of iodine. The continuously stirred reaction mixture is heated at 100° C. (oil bath), under nitrogen, for 20 hr.; hydrogen sulfide is evolved. The bath temperature is then raised 130-140° C. and stirring continued. After 4 hr. the evolution of hydrogen sulfide decreases significantly and a viscous reaction mixture is obtained. The polymer is precipitated, washed, and dried to yield 12 g. of product; $\eta_{inh.}=0.94$ (I).

Example 12.—This example illustrates the preparation of high viscosity poly(4,4'-methylenedicyclohexylenethiourea) and the preparation therefrom of as-extruded fibers suitable for use in fabrics.

To a stirred solution of PACM (14 g., 0.067 mole, 98.9% t.t.) in a mixture of hexamethylphosphoramide (200 ml.) and pyridine (5.6 ml.), under nitrogen, is added $CS_2$ (4.42 ml., 0.074 mole). The solution is stirred for 5 minutes at autogenous temperature, after which the reaction vessel is immersed in an oil bath at 99° C.; 4.25 hr. after immersion the oil bath temperature reaches 109° C.; 28 hr. after immersion the bath temperature reached 118° C. The reaction mixture is then cooled and permitted to stand at room temperature for 1-2 days. It is then poured into water to precipitate the polymer which is collected, washed in a blender with water (5×) and with acetone (2×), and dried at 100° C. in a vacuum oven; yield is 16.4 g., $\eta_{inh.}=4.2$ (II). A repetition of this synthesis (initial oil bath temperature=104° C.; temperature reached 113° C. four hr. after immersion and 111° C. at about 28 hr. after immersion, whereupon the reaction is cooled and stands 1-2 days at room temperature before polymer isolation, as above) yields 16.5 g. of polymer; $\eta_{inh.}=4.16$ (II).

A spinning solution is prepared by first combining 15.6 g. of the first sample and 14.4 g. of the second sample, above, with 422 ml. of a mixture of N,N-dimethylacetamide/LiCl (97/3, wt./wt.), with stirring; 68 ml. of the solvent mixture is then added to produce a spinning solution containing 6% by weight of the polythiourea. A portion of this solution is extruded through a 100-hole spinneret, each hole of 0.0025 inch (0.006 cm.) diameter, into a water bath maintained between about 72-76° C. The resulting yarn is wound up at 35.5 ft./min. (10.8 m./min.), extracted about 2 days in distilled water, and dried in a vacuum oven at 100° C. Filament tensile properties are: T/E/Mi/Den.: 3.4/17.2/51.2/1.75. These fibers are especially useful for preparing fabrics. After a sample of this yarn is drawn 1.35×, under nitrogen, in a 33 inch (0.82 meter) hot tube whose center portion is maintained at 312° C., the following filament properties are observed: T/E/Mi/Den.: 5.3/5.9/86/1.26.

Example 13.—This example illustrates the preparation of a polythiourea from 1,4-diaminocyclohexane and PACM by the process of this invention. The copolymer comprises repeating units corresponding to the formula

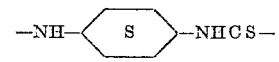

and

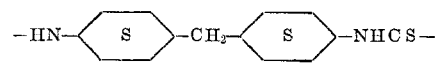

in the relative ratio (mole basis) of 65/35; fibers are prepared.

A reaction mixture comprising 1,4-diaminocyclohexane (3.5 g., 0.031 mole), PACM (3.5 g., 0.017 mole, 70% t.t.), hexamethylphosphoramide (100 ml.), LiCl (2 g., 0.047 mole), pyridine ((3.43 ml., 0.043 mole), and $CS_2$ (3.3 ml., 0.054 mole) is stirred and heated at 100° C. overnight (i.e., about 16-20 hr.) under nitrogen. Additional hexamethylphosphoramide (100 ml.) and LiCl (6 g., 0.06 mole) are added, after which the reaction mixture is cooled to room temperature. A portion of the reaction mixture is then extruded through a 20-hole spinneret, each hole of 0.003 inch, 0.005 cm.) diameter, into a water bath maintained at room temperature. The resulting filaments are wound up at 36 ft./min. (11 m./min.), washed in water overnight, and dried. Filament properties are: T/E/Mi/Den.: 2.44/41.9/48.7/2.1. The remainder of the reaction mixture is combined with water to precipitate the polymer which is collected, washed with water (2×) and acetone (1×), and dried to constant weight in a vacuum oven of 100° C.; yield is 5.9 g., $\eta_{inh.}=3.52$ (II).

Presented below in Table II is a summary of the reaction conditions and results of syntheses of other Formula I copolythioureas by the process of this invention. These syntheses were performed as in Example 13, above, except as noted in the table (i.e., "Same"=conditions of Ex. 13). In the table, "Solvent" signifies hexamethylphosphoramide and the meanings of diamines A, B, and C are explained in the legend. All values of copolymer $\eta_{inh.}$ were determined in m-cresol (i.e., I), except as noted. Th column entitled "Shaped Article" appropriately indicates that a fiber and/or film is prepared from the particular copolymer by procedures similar to or equivalent to those shown in other examples herein.

TABLE II

| Example | Diamines | Reaction conditions - Initial reagents | Reaction conditions - Time/temp. | Added reagents | Shaped article | Copolymer $\eta_{inh}$ | Copolymer repeat unit structures | Mole ratio |
|---|---|---|---|---|---|---|---|---|
| 14 | {PACM (4.62 g., 0.022 mole); A (2.46 g., 0.022 mole)} | Same, but pyridine is 3.5 ml. | Same | Same, but LiCl=2 g | Film fiber | [1] 3.93 | {-HN-⬡-S-⬡-CH₂-⬡-S-NHCS-; -HN-⬡-S-⬡-NHCS-} | 50/50 |
| 15 | {PACM (6.94 g., 0.033 mole); A (1.23 g., 0.011 mole)} | As in Ex. 14 | About 22 hr./100° C. Ambient temp. for about 41 hrs. | Same, but solvent=50 ml, LiCl=1 g | Fiber | 1.82 | Same as Ex. 14. | 75/25 |
| 16 | {PACM (3.5 g., 0.017 mole); B (3 g., 0.026 mole)} | Same | Same | Only LiCl added, 2 g | Film fiber | 0.88 | {-HN-⬡-S-⬡-CH₂-⬡-S-NHCS-; -HN-(CH₂)₆-NHCS-} | 40/60 |
| 17 | {PACM (4.62 g., 0.022 mole); B (2.46 g., 0.022 mole)} | As in Ex. 14 | Same, stands 72 hr. at ambient temp. before film preparation and $\eta_{inh}$ determination. | None | do | 1.43 | Same as Ex. 16. | 50/50 |
| 18 | {PACM (6.94 g., 0.033 mole); B (1.23 g., 0.011 mole)} | As in Ex. 14 | As in Ex. 15 | do | Fiber | 1.32 | Same as Ex. 16. | 75/25 |
| 19 | {PACM (6 g., 0.0285 mole); C (1.87 g., 0.0065 mole)} | Same, but pyridine=3.04 ml., CS₂=2.86 ml. | Same | do | Film fiber | 1.41 | {-HN-⬡-S-⬡-CH₂-⬡-S-NHCS-; -HN-⬡-S-⬡-NHCS-} | 75/25 |
| 20 | {A (3 g., 0.026 mole); B (3 g., 0.026 mole)} | Same, but pyridine=3.84 ml., CS₂=3.61 ml. | Intermittent stirring for about 16 hr./100°C.; steady stirring 6 hr./100° C. | do | None | 1.77 | {-HN-⬡-S-⬡-NHCS-; -HN-(CH₂)₆-NHCS-} | 50/50 |
| 21 | {A (2.7 g., 0.024 mole); B (0.3 g., 0.0026 mole)} | Solvent=50 ml, LiCl=1 g., pyridine=1.0 ml., CS₂=1.8 ml. | Same | None | Fiber | [1] 2.03 | Same as Ex. 20. | 90/10 |
| 22 | {A (2.75 g., 0.024 mole); B (0.75 g., 0.0065 mole)} | As in Ex. 21 | Same | None | None | 1.38 | Same as Ex. 20. | 80/2 |

See footnotes at end of Table III.

Example 23.—This example illustrates the preparation of poly(4,4'-dicyclohexylenethiourea) by the process of this invention. The polymer comprises repeating units corresponding to the formula

-NH-⬡-S-⬡-NH-CS-

A reaction mixture comprising perhydrobenzidine (3.5 g., 0.018 mole, 99% t.t.), hexamethylphosphoramide (50 ml.), pyridine (1.5 ml., 0.019 mole), and CS₂ (1.4 ml., 0.023 mole) is stirred and heated at 100° C. for about 16 hr. under nitrogen. Additional LiCl (1 g., 0.01 mole) are added. The reaction mixture is then cooled to room temperature before being combined with water to precipitate the polymer which is collected, washed, and dried as in Example 13; Yield is 3.7 g.; $\eta_{inh.}$=3.25 (hexamethylphosphoramide/N-methylpyrrolidone-2) (50/50, v./v.) containing 6.5% by weight LiCl.

Presented below in Table III is a summary of the reactions and results of syntheses of other Formula I homopolythioureas by the process of this invention. These syntheses were performed as in Example 23, above, except as noted in the table (i.e., "Same"=conditions of Ex. 23). In the table, "Solvent" signifies hexamethylphosphoramide and the meanings of diamines A–C are explained in the Legend. All values of polymer $\eta_{inh}$ were determined in m-cresol (i.e., I), except as noted.

TABLE III

| Example | Diamine | Initial reagents | Reaction conditions Time/temp. | Added reagents | Polymer $\eta_{inh.}$ | Polymer repeat unit structure |
|---|---|---|---|---|---|---|
| 24 | A (3.5 g.) (0.031 mole) | Same, but CS$_2$=2 ml., pyridine= 2.1 ml. | Same | Same | II 2.45 | —HN—⟨S⟩—NHCS— |
| 25 | B (6 g.) (0.052 mole) | Solvent=100 ml. LiCl=1 g., pyridine=4.15 ml. CS$_2$=3.9 ml. | Same | None | 1.38 | —HN—(CH$_2$)$_6$NHCS— |

Legend:
A=1,4-Diaminocyclohexane (99% t.).
B=Hexamethylenediamine.
C=Perhydrobenzidine (99% t.).
II=N,N-dimethylacetamide/LiCl (95/5, wt./wt.).
All PACM samples are 70% t.t.

Example 26.—This example illustrates the preparation of high molecular weight polymer wherein the reaction time is as short as 2 hours.

(A) In a 250 ml., 3-necked flask fitted with a reflux condenser, stirrer and gas addition tube are placed 100 ml. of N,N-dimethylacetamide, 1.5 g. of lithium chloride and 7.0 g. (0.033 mole) of PACM. To the stirred solution at room temperature is added 2.0 ml. (2.52 g., 0.033 mole) of carbon disulfide whereupon a white precipitate forms. A rapid flow of nitrogen is begun and the flask is immersed in an oil bath maintained at 115–117° C. Aliquot samples, taken at two hour intervals, are combined with water and the recovered polymer is washed in water and dried in vacuum. Inherent viscosity determined in N,N-dimethylacetamide/LiCl (95/5, wt./wt.) for polymer isolated at 2, 4 and 6 hours, is 1.36, 1.47 and 1.73, respectively.

(B) In a similar experiment, 3.0 ml. (3.79 g., 0.049 mole) of carbon disulfide is added to a mixture of 7.0 g. (0.033 mole) of PACM in 100 ml. of N,N-dimethylacetamide. Polymer which is isolated after 2, 4 and 6 hours, has inherent viscosity of 1.47, 1.6 and 1.6, respectively.

What is claimed is:

1. Process for preparing high-molecular weight polythioureas comprising reacting carbon disulfide with at least one diamine of the group consisting of tetramethylene diamine; pentamethylene diamine; hexamethylene diamine; octamethylene diamine; nonamethylene diamine; decamethylene diamine; dodecamethylene diamine; 1,4-diaminocyclohexane; 1,3-diaminocyclohexane; perhydrobenzidine; 4,4'-(isopropylidene) dicyclohexylamine; p-xylylene diamine and 1,4-bis(2-aminoethyl)benzene, at a temperature of about 100 to 150° C. for between about 0.5 to 24 hours, said carbon disulfide and said diamine being dissolved in at least one solvent selected from the group consisting of amides, ureas, dimethylsulfoxide and pyridine.

2. Process of claim 1 wherein said amides are selected from the group consisting of N,N-dimethylacetamide, N,N-dimethylformamide, hexamethylphosphoramide and N-methylpyrrolidone-2.

3. Process of claim 1 wherein said temperature is about 100 to 130° C.

4. Process of claim 1 wherein the reaction time is about 2 to 6 hours.

5. Process of claim 1 wherein the reaction is carried out in a nitrogen atmosphere.

6. Process of claim 1 wherein said diamine is reacted with at least an equimolar quantity of said carbon disulfide.

7. Process of claim 1 wherein said solvent contains a salt selected from the group consisting of lithium chloride and calcium chloride.

8. Process for preparing high-molecular weight polythioureas comprising reacting carbon disulfide with at least about 35 mole percent, based upon the total diamine content, of at least one type of diamine of the formula:

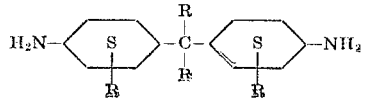

wherein each R is individually selected from the group consisting of hydrogen and methyl, and less than about 65 mole percent, based upon the total diamine content, of at least one diamine selected from the group of tetramethylene diamine; pentamethylene diamine; hexamethylene diamine; octamethylene diamine; nonamethylene diamine; decamethylene diamine; dodecamethylene diamine; 1,4-diaminocyclohexane; 1,3-diaminocyclohexane; perhydrobenzidine; 4,4'-(isopropylidene) dicyclohexylamine; p-xylylene diamine and 1,4-bis(2-aminoethyl)benzene, at a temperature of about 100 to 150° C. for between about 0.5 to 24 hours, under a nitrogen atmosphere, wherein said carbon disulfide is reacted in at least equimolar quantities with respect to the total quantities of said diamines, and said carbon disulfide and said diamines being dissolved in at least one solvent selected from the group consisting of: N,N-dimethylacetamide, N,N-dimethylformamide, hexamethylphosphoramide; N-methylpyrrolidone-2, dimethylsulfoxide, and pyridine.

9. Process of claim 8 wherein at least about 75 mole percent of the total diamine content are diamines of said formula wherein R is hydrogen.

10. Process of claim 9 wherein said mole percent is essentially 100.

11. Process of claim 10 wherein said temperature is about 100 to 130° C. and the reaction time is about 2 to 6 hours.

12. Process of claim 10 wherein said solvent contains a salt selected from the group consisting of lithium chloride and calcium chloride.

13. Process for preparing high-molecular weight polythioureas comprising reacting carbon disulfide with at least one type of diamine of the formula:

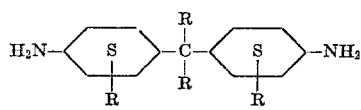

wherein each R is individually selected from the group consisting of hydrogen and methyl, at a temperature of about 100 to 150° C. for between about 0.5 to 24 hours, said carbon disulfide and said diamine being dissolved in at least one solvent selected from the group consisting of amides, ureas, dimethylsulfoxide and pyridine.

References Cited
UNITED STATES PATENTS 2,356,764   8/1944   Kern _____ 260—79
2,566,717   9/1951   Carpenter et al. _____ 260—79

DONALD E. CZAJA, Primary Examiner

M. I. MARQUIS, Assistant Examiner

U.S. Cl. X.R.
260—30.6 R, 30.2 R, 32.6 R, 37 R, 79 R; 264—184 R, 205 R